Feb. 22, 1927.  
F. C. HERSEE ET AL  
WHEEL REMOVING DEVICE  
Filed Jan. 22, 1926
1,618,195
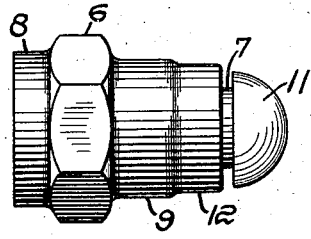
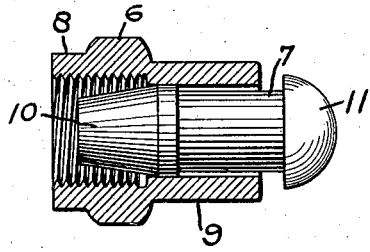
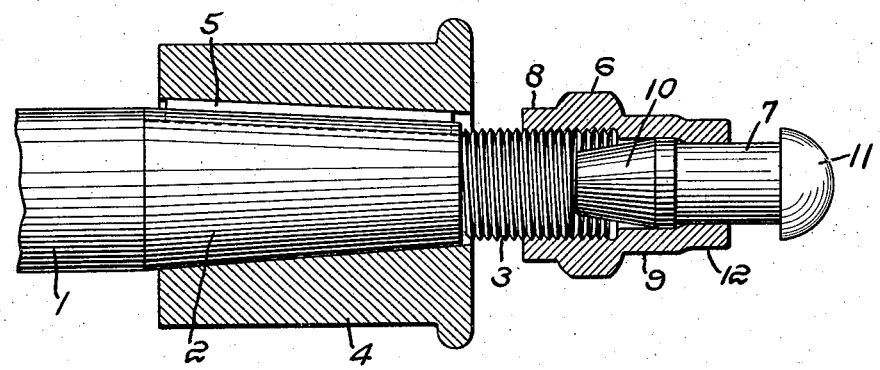
Inventors:  
Frederick C. Hersee,  
Nathaniel T. Wiley,  
by Emery, Booth, Janney and Varney  
Attys.

Patented Feb. 22, 1927.

1,618,195

UNITED STATES PATENT OFFICE.

FREDERICK C. HERSEE, OF WATERTOWN, AND NATHANIEL T. WILEY, OF SOMERVILLE, MASSACHUSETTS; SAID WILEY ASSIGNOR TO SAID HERSEE.

WHEEL-REMOVING DEVICE.

Application filed January 22, 1926. Serial No. 82,984.

The invention relates to wheel-removing devices and aims to provide novel and improved means to facilitate the removal of a wheel or other rotative element from its mounting, such as an axle, spindle, or the like, to which it is detachably secured, usually in rigid relationship.

The invention will best be understood from a description of one selected embodiment thereof illustrated in the accompanying drawings, to which reference may be had.

Referring to the drawings, Fig. 1 represents a full side view of the device, the plunger being shown in a slightly retracted position;

Fig. 2, a vertical longitudinal section showing the device in a nearly complete state of manufacture and prior to swaging the outer end of the holder for preventing total displacement of the plunger; and Fig. 3, a view similar to Fig. 2, showing the completed device operatively mounted upon the threaded end of a vehicle axle.

The mounting selected and herein represented (see Fig. 3) to illustrate the application of our invention is the usual type of rear or driven axle 1 of an automobile, which is shown as having a tapered end portion 2 terminating in a reduced screw threaded extension 3 adapted to receive one or more nuts (not shown) by means of which the hub 4 of the wheel is usually secured against lengthwise displacement. Ordinarily the hub 4 is rigidly secured on the tapered portion 2 of the axle by means of a key 5, which prevents relative rotative movement of these parts and often becomes so firmly seated in its given position as to effectually prevent the wheel being readily drawn off the axle. The application of an auuxiliary appliance in the nature of a wheel puller then becomes necessary.

The present device comprises a casing 6, which is detachably secured to the threaded portion 3 of the axle, and a free plunger 7 slidably mounted in the casing and adapted to be moved into engagement at its inner end with the axle and to project at its opposite end beyond the casing. This casing may be of any convenient shape or size adapted to the purpose and in the present embodiment has a central portion which is screw-threaded interiorly and exteriorly is provided preferably with a gripping face or medium such as herein shown in the form of a hex nut. On opposite sides of this central portion are provided tubular extensions 8, 9, of reduced cross dimensions, the front extension 8 being interiorly threaded and adapted for attachment to the threaded portion 3 of the axle, while the remaining extension 9 on the opposite side has a smooth bore of preferably reduced diameter and adapted to receive the central or body portion of the plunger 7, whose axis is disposed in alignment with the axis of the axle.

The plunger 7 is provided at its front end with a tapered head 10 for free projection into the enlarged or threaded end of the casing which lies beyond the rear extension 9, and at its rear end with a hemispherical boss 11 arranged wholly outside of the casing and adapted to seat upon the rim of the extension 9 at the limit of inward movement of the plunger. The head 10 is formed at its front end with a flat nose to butt upon the outer end of the axle. Preferably the entire plunger is properly heat treated before assembling with the casing to insure a proper degree of hardness to withstand the force of impact to which it is subjected in use, although the same degree of hardness is not necessary in the casing. In the process of manufacture, after insertion of the plunger into the casing, the outer extremity of the rear extension 9 is preferably swaged or compressed slightly inward at 12 to form an interior annular flange which in the finished product forms a stop to prevent the complete displacement and separation of the plunger from the casing.

In practice, before applying the device to the axle, the nuts ordinarily employed to hold the wheel in operative position are removed from the threaded portion 3 of the axle. The casing is then screwed onto said threaded portion 3 far enough to insure a firm setting and to permit the plunger to butt upon the axle. When this has been done force is applied substantially in a line parallel with the axis of the plunger to the exposed boss 11, preferably by means of a mallet or hammer, the resulting sudden impact of the plunger upon the axle being effectual to unseat or dislodge the wheel so that it may be readily drawn off. In this connection it may be said that it has been found advantageous before removing either of the rear or driven wheels to elevate and support in a slightly raised position the opposite wheel, thus removing the resistance otherwise offered thereby to the operation above described.

It will be understood that our invention is not limited to the specific embodiment herein described and shown but is susceptible of various modifications and alterations, including substitution, addition, and rearrangement of parts.

We claim:

1. A device of the character described comprising, in combination, two members, one slidably mounted within the other, having their axes coincident, one of said members being adapted to be screwed onto and off the threaded end of a shaft, the other of said members having an enlarged portion at each end and adapted to butt upon said shaft at one end and projecting at its opposite end beyond the outer member, a portion of the bore of said outer member being smaller in cross-section than the enlarged portions of the inner member and providing a bearing for the inner member.

2. A device of the class described comprising, in combination, two inseparable concentric members constituting a unitary assembly, one of such members being slidably mounted within the other, the outer member having an interiorly threaded collar portion adapted to make engagement with the threaded end of the shaft, and a portion extending away from said collar portion and having a smooth bore of smaller diameter than the bore of said collar portion, and said inner member having enlarged end portions, one of such end portions being adapted to butt upon said shaft when actuated forward, and the other of said end portions being extended beyond the outer member and adapted to receive blows applied from an exterior object, the rear portion of said outer member being adapted to provide a bearing for the support of said inner member.

3. A new article of manufacture comprising, in combination, a tubular member interiorly threaded at one end and adapted to be screwed onto and off the threaded end of a shaft, said tubular member having a smooth bore in its opposite end smaller in cross-section than the bore of said threaded portion, a free plunger slidably mounted in the smooth portion of the bore of the tubular member in alinement with the shaft and extending at its rear end through and beyond the tubular member, a portion of the rear end of the tubular member being compressed around the body portion of the plunger for providing a bearing therefor said plunger terminating at each of its ends in a headed portion larger in cross-section than said compressed portion of the tubular member.

4. A device of the class described comprising, in combination, two inseparable concentric members, one slidably mounted within the other, one of said members having a threaded collar portion adapted to be screwed onto and off the threaded end of a shaft, and a portion extending away from said collar portion and having a smooth bore therein, the other of said members having a headed portion at each end, the rear end thereof being extended through and beyond said outer member and the front end thereof being adapted at the limit of forward movement of the inner member to butt upon said shaft and at the limit of rearward movement to extend into the smooth portion of the bore of the outer member, a portion of the bore in the rear end of the outer member surrounding the body portion of the inner member being reduced to less than the cross-section of either of the headed portions of the inner member and adapted to provide a bearing for the inner member.

5. A device for disengaging a wheel detachably mounted upon a shaft or axle, comprising a tubular member adapted to be supported by said shaft or axle and having an interiorly threaded portion for engaging the threaded end of the shaft or axle, and a plunger inseparably associated therewith and slidable therein, a portion of the bore of the tubular member providing a bearing for said plunger, said plunger being arranged to present one end to butt upon said axle or shaft and extending at its opposite end beyond said tubular member to receive the blow of a percussive implement, said device including said tubular member being adapted to move bodily with the shaft under such blow.

In testimony whereof, we have signed our names to this specification.

FREDERICK C. HERSEE.
NATHANIEL T. WILEY.